US007873434B2

(12) United States Patent
Pape

(10) Patent No.: US 7,873,434 B2
(45) Date of Patent: Jan. 18, 2011

(54) CUTTING PATTERN MANIPULATION AND METHODS

(76) Inventor: Ryan L. Pape, 214 Greenwich Blvd., San Antonio, TX (US) 78209

( * ) Notice: Subject to any disclaimer, the term of this patent is extended or adjusted under 35 U.S.C. 154(b) by 899 days.

(21) Appl. No.: 11/786,635

(22) Filed: Apr. 12, 2007

(65) Prior Publication Data

US 2007/0240548 A1 Oct. 18, 2007

Related U.S. Application Data

(60) Provisional application No. 60/791,111, filed on Apr. 12, 2006.

(51) Int. Cl.
*G06F 19/00* (2006.01)
*B26D 5/00* (2006.01)

(52) U.S. Cl. ....................... 700/171; 700/182; 156/250; 156/353

(58) Field of Classification Search ................... 700/98, 700/117, 118, 127, 134, 159, 160, 171, 182, 700/183; 156/212, 216, 250, 268, 353, 510; 703/6, 7, 8; 83/76.1
See application file for complete search history.

(56) References Cited

U.S. PATENT DOCUMENTS 5,997,670 A * 12/1999 Walter et al. .................. 156/71
6,001,198 A * 12/1999 Habisreitinger et al. ........ 156/64
6,062,629 A * 5/2000 Gentile .................. 296/136.07
6,360,801 B1 * 3/2002 Walter et al. ................ 156/354
6,444,311 B1 9/2002 Friedman et al.
6,485,082 B2 11/2002 Campfield et al.
6,699,346 B1 * 3/2004 Habisreitinger et al. ..... 156/229
6,926,339 B2 * 8/2005 Gentile .................. 296/136.07
6,940,022 B1 * 9/2005 Vinciarelli et al. .......... 174/256
7,079,916 B2 * 7/2006 Stimpson .................... 700/123
2004/0005428 A1 * 1/2004 Katoh et al. ............... 428/42.3
2005/0109454 A1 * 5/2005 Katoh et al. ................ 156/268
2007/0065584 A1 3/2007 Ryan et al.

OTHER PUBLICATIONS

U.S. Appl. No. 60/730,695.
U.S. Appl. No. 11/589,444.
Sam Anand, et al, "An Integrated Machine Vision Based System for Solving the Non-Convex Cutting Stock Problem Using Genetic Algorithms" Journal of Manufacturing Systems, vol. 18/No. 6—1999.

* cited by examiner

*Primary Examiner*—Charles R Kasenge
(74) *Attorney, Agent, or Firm*—Mark H. Miller; Sean C. Crandall; Jackson Walker LLP

(57) ABSTRACT

Automated methods implemented in a computer system are provided that allow the translation of geometric shapes from a cutting pattern having a nested configuration to geometric shapes shown in an installed configuration and vice-versa. Methods are also provided that allow modification of cutting patterns based on various modifications applied to the geometric shapes therein. Additionally, certain methods herein allow cutting patterns to be automatically modified to conform to protective films of different sizes. In certain embodiments, methods are provided for optimization of the arrangement of geometric shapes in a nested configuration so as to substantially minimize the surface area occupied by the geometric shapes. Automated pattern manipulation systems implementing one or more of the methods herein are also provided.

17 Claims, 10 Drawing Sheets

CUTTING PATTERN MANIPULATION AND METHODS

RELATED APPLICATION

This application claims priority to provisional application 60/791,111, entitled "Method For Two Dimensional Extracted Pattern Manipulation," filed on Apr. 12, 2006, the full disclosure of which is hereby incorporated by reference in full.

BACKGROUND

The present invention generally relates to manipulation of cutting patterns and the visual representation thereof, and more particularly, to manipulation of cutting patterns of protective films for application to three-dimensional objects.

Protective films are used for a variety of applications to protect the surface of objects from scratches, nicks, and degradation due to exposure to the environment. One example of a protective film application is the plastic overlay used to protect consumer electronic device screens. Another example of protective films used to protect fragile surfaces include certain vehicle surfaces, which are prone to damage due to flying pebbles, rocks, sand, and exposure to the environment, such as, for example, the front hood, the front fenders, and the headlights. Protective films include window tint patterns applied to vehicle windows and windshields. The need for protective films for vehicles is exacerbated by stricter environmental standards that while motivating more environmentally-friendly paints, have resulted in paints and coatings that are less robust and enduring. Accordingly, protective films are often used as an additional layer of protection to preserve the paints and coatings on certain surfaces of vehicles. Common types of protective films, include, but are not limited to, flexible urethane films and PVC films.

As one example of how protective films may be used to protect certain vehicle surfaces, a vehicle owner might apply one protective film to the right fender of the vehicle, another protective film to the left fender of the vehicle, and another protective film to the front hood portion of the vehicle. Each piece of protective film must be custom-sized to conform the protective film to the dimensions of the vehicle.

Because of the great variety of vehicle shapes and dimensions, protective films for consumers are often provided in custom-shapes on an on-demand basis by service providers. That is, a particular consumer will request a set of protective films for parts of a vehicle. The service provider will then cut a set of pieces of protective film from a fixed sheet or roll of protective film to produce the custom-sized pieces (or geometric shapes) of protective film. The service provider often uses a cutter or plotter to cut the custom-sized protective film pieces with the use of a cutting pattern.

Generally, the geometric pieces of protective film are of numerous shapes and sizes. Because of the high cost of protective film, it is desirable to maximize the use of costly raw materials (i.e. to minimize waste of the protective film). Often, the raw material is in the form of a sheet that is bigger than the dimensions of individual parts needed to be cut from it, whether they are different parts or a number of parts of the same type. Therefore, it is desirable to "squeeze in" the geometric shapes in a cutting pattern as close as possible so as to minimize waste of the protective film. This "squeezed in" configuration of the geometric shapes is referred to herein as a "nested configuration." The problem of laying out parts on the stock sheet to minimize scrap losses is known as the cutting stock problem. The cutting stock problem is common across a number of industries, such as the sheet metal, lumber, glass, leather, textile, and paper industries. One solution to the problem has been to develop algorithms for nesting irregularly shaped parts. In particular, the leather and apparel industries deal with irregularly shaped parts as well as irregularly shaped sheets (such as raw leather). The data for a stock cutting problem usually comprise the following types of information: dimensions of the sheet or film from which geometric shapes are to be cut, pattern data representing the shape and size of each geometric shape, and a set of placement constraints (e.g. that the geometric shapes may not overlap with one another and must lie entirely on the sheet within which they are placed, etc), and an objective (e.g. an optimal or near-optimal use of the protective film that minimizes waste).

Frequently, in a nested configuration, the geometric shapes to be cut are rotated and arranged in the cutting pattern in such a way that, although minimizing unused portions of the protective film, the result is an arrangement that is difficult for the service provider to ascertain how the pieces should be installed. In other words, because of the optimized arrangement of the geometric shapes in the nested configuration, it is no longer obvious how the numerous pieces relate to one another and to the vehicle surface on which they are to be installed. Thus, there is a need for a system that conveys how to translate the pieces from the nested configuration into the proper arrangement of pieces for installation on a vehicle.

Typically, an initial cutting pattern is selected from a library of cutting patterns that correspond to each vehicle make and model. Thus, knowing the make and model of a vehicle, a service provider can select the appropriate custom-designed cutting pattern from a library of cutting patterns thereby allowing the service provider to cut the correctly-sized pieces of protective film.

Additionally, consumers often desire to modify the shapes and sizes of the pieces of protective film according to their personal preferences. Conventional methods of modifying cutting patterns involve a designer painstakingly modifying a cutting pattern by manual methods to achieve the consumer-desired modification. One complication with such a system, however, would be the ongoing requirement for updates arising from the constant production of new models of vehicles thus requiring new cutting patterns to be developed. Thus, an automated method of modifying cutting patterns would be desirable to minimize the time and cost of modifying cutting patterns.

Examples of consumer modifications to cutting patterns include trailing line manipulations, entity cut-down operations, and wrap extension modification operations, among others. Briefly, trailing line manipulations involve applying a curve to one or more geometric shapes having a straight line. Consumers sometimes opt for this modification, because straight-lines can be considered unsightly in some applications, and because a straight line contrasts sharply and visibly with the front of most vehicle designs, which typically have some curve to them. Since the paint protection film is designed to be nearly invisible, some consumers would prefer a curve or arc that is more in keeping with the design of the vehicle. Accordingly, cutting patterns often need to be modified to incorporate this design preference. Because trailing lines are often shared across multiple geometric shapes, modifying a trailing line is difficult manually in part because the curvature of the trailing line modification must be consistent across one or more geometric shapes. To overcome this painstakingly difficult manual operation, some service providers provide consumers with a selection of predetermined cutting patterns, but this selection limits the consumer's range of choices and generating the multiple pre-determined cutting patterns manually can be tedious and time-consuming.

Entity cut-down operations involve the adaptation of one cutting pattern to a cutting pattern of a different dimensions. Cutting patterns are usually designed for rolls of protective films having a particular fixed width. Occasionally, a service provider may wish to adapt the cutting patterns to function with a sheet of protective film of different dimensions or to a roll of protective film having a different width. This modification of cutting patterns to allow the cutting pattern to be cut from a protective film of a different dimension is referred to herein as an entity cut-down operation.

Wrap extension modification operations refer to the extension of a portion of a piece of protective film to be longer than the original designed length. Traditional cutting pattern designs approach the edge of a surface to be protected to within about 1/16" or 1/32" of the edge, leaving a small remaining section vulnerable to damage. Some consumers prefer cutting patterns that allow the protective film to wrap around the edge of a protected component for complete coverage and in some cases, to avoid the protective film terminating near the edge. This is particularly true in hood applications, which would potentially result in an unsightly straight line instead of a smooth transition. Consumers who prefer patterns that wrap around the edge of a protected surface typically need to have a designer create a pattern one using manual or other highly inefficient methods.

Thus, numerous motivations exist for changing cutting patterns for protective film. The manual method of painstakingly modifying the cutting pattern is unsatisfactory. Therefore, an automated efficient method of modifying cutting patterns is desired. Additionally, an automated method for displaying the corresponding modified cutting patterns in their nested and installed configuration is desired.

SUMMARY

The present invention generally relates to manipulation of cutting patterns and the visual representation thereof, and more particularly, to manipulation of cutting patterns of protective films for application to three-dimensional objects.

One example of an automated method implemented in a computer system for manipulation of a two-dimensional cutting pattern, the cutting pattern for cutting a plurality of geometric shapes from a protective film, the protective film for application to a three-dimensional object comprises providing pattern data wherein the pattern data represents the plurality of geometric shapes and a nested configuration of the geometric shapes residing in a two-dimensional plane wherein the pattern data may be used to form a plurality of commands to a cutter for cutting of the geometric shapes from the protective film wherein the plurality of commands are used to form the two-dimensional cutting pattern; associating with the pattern data a plurality of high-level tags wherein each high-level tag is associated with a high-level user operation that comprises information translating the position of the geometric shapes from the nested configuration to an installed configuration; and generating a visual representation of the plurality of geometric shapes in an installed configuration by computing a repositioning of the geometric shapes based on the pattern data and the high-level tags wherein the installed configuration directly associates each geometric shape of the protective film with a portion of the three-dimensional object.

Another example of an automated method implemented in a computer system for manipulation of a two-dimensional cutting pattern, the cutting pattern for cutting a plurality of geometric shapes from a protective film wherein the protective film is of a fixed width, the protective film for application to a three-dimensional object comprises providing pattern data wherein the pattern data represents the plurality of geometric shapes and a nested configuration of the geometric shapes residing in a two-dimensional plane wherein the pattern data may be used to form cutting instructions for cutting of the geometric shapes from the protective film wherein the cutting instructions are used to form the two-dimensional cutting pattern; wherein the cutting instructions are adapted to cut the geometric shapes from protective film of a first fixed width; associating with the pattern data a plurality of high-level tags wherein each high-level tag is associated with a high-level user operation that comprises information translating the position of the geometric shapes from the nested configuration to the installed configuration; and generating a modified cutting pattern capable being adapted to a protective film of a second fixed width wherein the second fixed width is smaller than the first fixed width.

Another example of an automated method implemented in a computer system for manipulation of a two-dimensional cutting pattern, the cutting pattern for cutting a plurality of geometric shapes from a protective film, the protective film for application to a three-dimensional object comprises providing pattern data representing the plurality of geometric shapes in an installed configuration; associating with the pattern data a plurality of high-level tags wherein each high-level tag is associated with a high-level user operation that comprises information translating the position of the geometric shapes from the nested configuration to the installed configuration; allowing modification to the geometric shapes in the installed configuration; modifying the pattern data to incorporate the modification so as to generate modified pattern data; and generating a cutting pattern based on the modified pattern data and the high-level tags that correspond to a nested configuration of the geometric shapes wherein the nested configuration is optimized so as to substantially minimize a total surface area occupied by the geometric shapes on the protective film.

An example of an automated pattern manipulation system for manipulating a two-dimensional cutting pattern, the cutting pattern for cutting a plurality of geometric shapes from a protective film, the protective film for application to a three-dimensional object, said system comprises (a) electronics adapted to (1) store pattern data wherein the pattern data represents the plurality of geometric shapes and a nested configuration of the geometric shapes residing in a two-dimensional plane wherein the pattern data may be used to form a plurality of commands to a cutter for cutting of the geometric shapes from the protective film wherein the plurality of commands are used to form the two-dimensional cutting pattern and wherein the pattern data is associated with a plurality of high-level tags wherein each high-level tag is associated with a high-level user operation that comprises information translating the position of the geometric shapes from the nested configuration to the installed configuration and (2) generate a modified cutting pattern based on a plurality of modification instructions, the pattern data, and the high-level tags wherein the modified cutting pattern is optimized so as to generate a nested configuration that substantially minimizes a total surface area occupied by the geometric shapes when the geometric shapes are conformed to fit in the dimensions of the protective film in a two-dimensional plane; and (b) a user interface adapted to: (1) receive the modification instructions corresponding to modifications to the geometric shapes in one of (i) a nested configuration and (ii) an installed configuration; and (2) display the modified cutting pattern and the modified installed configuration.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein.

Figure 1A:
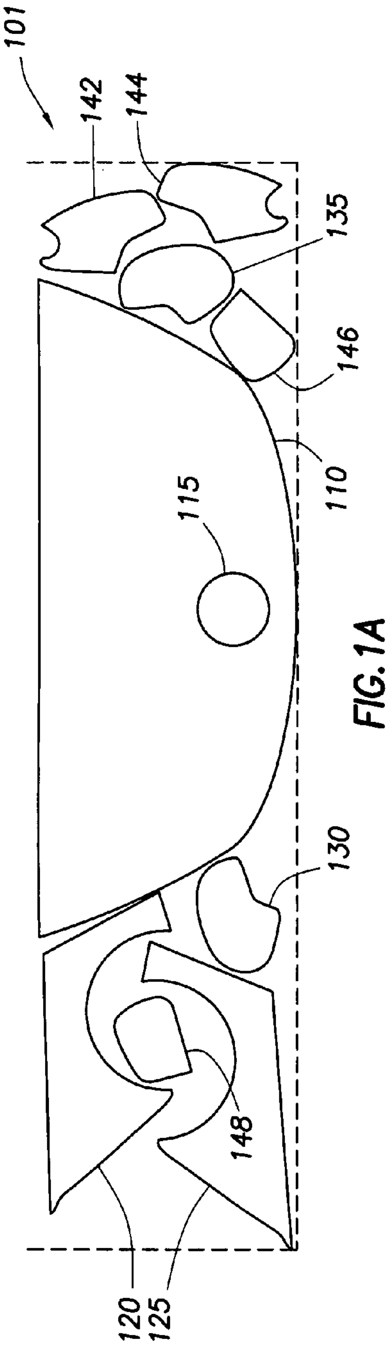
FIG. 1A illustrates a cutting pattern with a plurality of geometric shapes shown in a nested configuration.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention generally relates to manipulation of cutting patterns and the visual representation thereof, and more particularly, to manipulation of cutting patterns of protective films for application to three-dimensional objects.

In certain embodiments, automated methods implemented in a computer system are provided that allow the translation of geometric shapes from a cutting pattern having a nested configuration to geometric shapes shown in an installed configuration and vice-versa. Methods are also provided that allow modification of cutting patterns based on various modifications applied to the geometric shapes therein. Additionally, certain methods herein allow cutting patterns to be automatically modified to conform to protective films of different sizes. In certain embodiments, methods are provided for optimization of the arrangement of geometric shapes in a nested configuration so as to substantially minimize the surface area occupied by the geometric shapes. Automated pattern manipulation systems implementing one or more of the methods herein are also provided.

Advantages of the methods of the present invention may include one or more of the following: the ability to quickly generate modified cutting patterns of protective film, optimization of the arrangement of the geometric shapes therein, the visualization of the correspondence between nested and installed configurations, and the minimization of wasted protected film.

Although the methods and embodiments herein are discussed in the context of protective films for automobiles and more broadly, in the context of vehicles generally, it is recognized that the protective films herein could be applied to the surface or surfaces of any three-dimensional object that one wishes to protect, such as a protective helmet for example.

To facilitate a better understanding of the present invention, the following examples of certain embodiments are given. In no way should the following examples be read to limit, or define, the scope of the invention.

Translation and Rotation Operations and Visual Representation Thereof

FIG. 1A generally illustrates a cutting pattern with a plurality of geometric shapes shown in a nested configuration. More specifically, cutting pattern 101 comprises a plurality of geometric shapes wherein each geometric shape corresponds to a different surface area of a particular automobile. In particular, the following geometric shapes are depicted in cutting pattern 101: geometric shape 110 corresponding to a front hood, geometric shape 120 corresponding to a right fender, geometric shape 125 corresponding a left fender, geometric shape 130 corresponding to a right mirror, geometric shape 135 corresponding to a left mirror, and extra pieces, geometric shapes 142, 144, 146, and 148 corresponding to right and left mirrors.

As can be seen in FIG. 1A, geometric shapes 110, 120, 125, 130, 135, 142, 144, 146, and 148 are arranged in a way such that the geometric shapes or pieces are "squeezed in," and nested in such a way so as to maximize use of the protective film. In this way, the pieces are arranged so as to minimize the waste of unused portions of the protective film. This optimized configuration is referred to herein as a "nested configuration."

The dimensions and shapes of each geometric shape may be mathematically described by any method suitable to reproduce and render the geometric shapes, including, but not limited to, representing the geometric shapes by a set of Cartesian coordinates, representing the geometric shapes by a set of lines, curves, and/or arcs, any method known in the art for representing geometric shapes including computer aided design algorithms, or any combination thereof. The mathematical description of the geometric shapes is referred to herein as "pattern data." Pattern data may also include mathematical descriptions of the positions of the geometric shapes in a nested configuration or alternatively, the positions of geometric shapes in an installed configuration. The mathematical descriptions may be by way of absolute references or by relational references.

The pattern data may be used to form a plurality of commands to a cutter to form cutting patterns as depicted, for example, in cutting pattern 101. As shown in FIG. 1A, extra "left-over" or unused space has been taken advantage of by including in the cutting pattern geometric shapes for pieces of protective film 142, 144, 146, and 148. In this way, optimal use of the protective film is achieved. The addition of extra geometric shapes 142, 144, 146, and 148 may be added manually by the user, or added automatically by the computer according to pre-specified criteria.

Figure 1B:
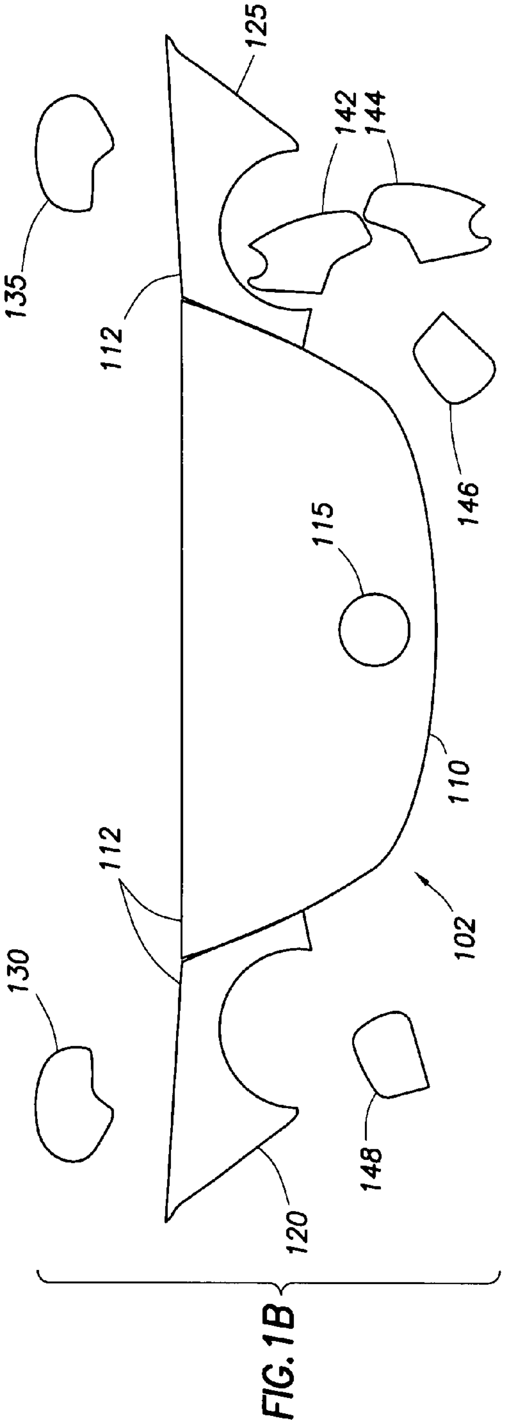
FIG. 1B illustrates the geometric shapes of FIG. 1A shown in an installed configuration.

Because geometric shapes 110, 120, 125, 130, 135, 142, 144, 146, and 148 are arranged in a nested configuration, the proper orientation of each piece of protective film may not be immediately apparent to the service provider. Additionally, visualizing the final or installed configuration of the pieces may be difficult without more information than just cutting pattern 101 showing the nested configuration. Accordingly, it is desirable to generate a final art work layout showing an installed configuration of the pieces of protective film. The term "installed configuration," as used herein refers to any visual depiction of the geometric shapes that would aid a service provider in determining the proper placement and orientation of the pieces of protective film on an object. The term "installed configuration" explicitly includes both two-dimensional and three-dimensional depictions of the geometric shapes. In certain embodiments, the installed configuration may be a three-dimensional exploded view, showing the geometric shapes in a three-dimensional relationship to one another in space in their respective proper orientation with respect to the vehicle to be protected. FIG. 1B illustrates the geometric shapes of FIG. 1A shown in an installed configuration. Optionally, an object, such as a vehicle, may be shown for reference purposes such that the geometric shapes are shown as they would be arranged around the object or alternatively, the geometric shapes may simply be shown without the object thus depicting the geometric shapes as merely "floating" in space in their installed configuration.

Figure 2A:
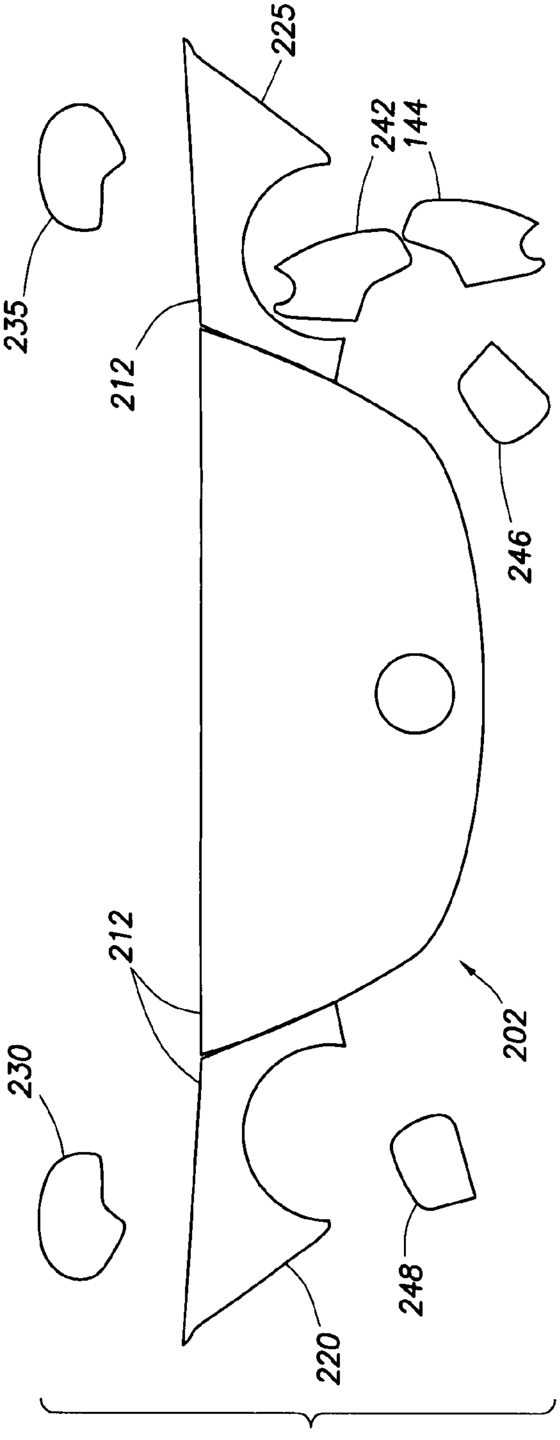
FIG. 2A illustrates a plurality of geometric shapes shown in an installed configuration in which three of the geometric shapes have been modified with a trailing line modification operation.
Figure 2B:
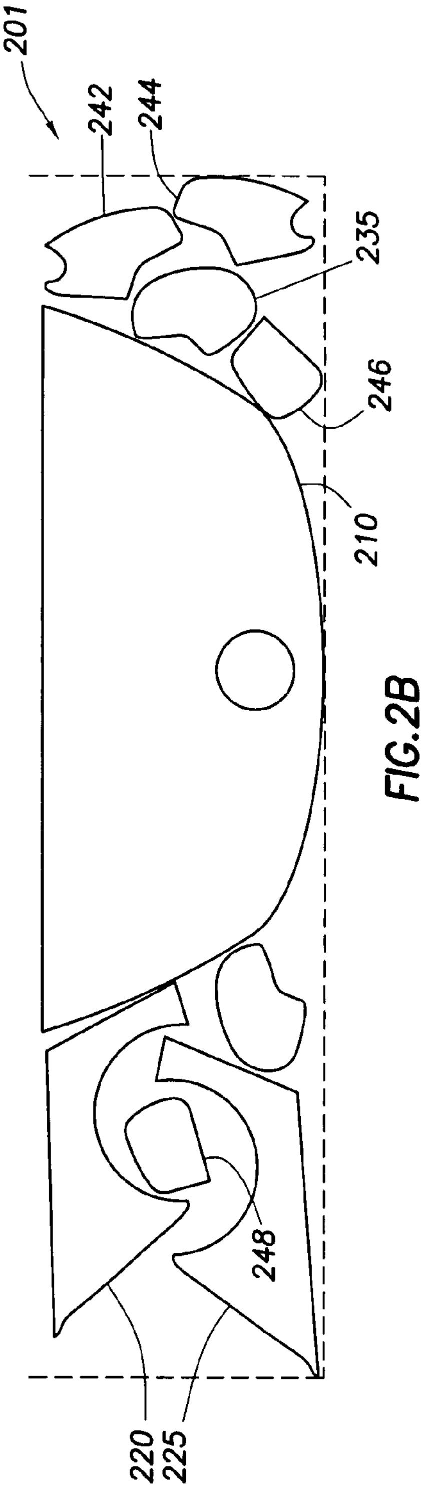
FIG. 2B illustrates a cutting pattern with the geometric shapes of FIG. 2A shown in a nested configuration.

For simplicity, a two-dimensional representation of installed configuration 102 is depicted in FIG. 2B. To perform the translation between nested configuration 101 and installed configuration 102, additional data may be stored with respect to the geometric shapes to enable the translation from nested configuration 101 to installed configuration 102 and vice-versa. This additional data to enable the translation of the geometric shapes from a nested configuration to an installed configuration and vice-versa is referred to herein as "high-level tags." High-level tags include high-level meta data that support specific high-level user operations including information indicating the appropriate orientation, rotation, and/or translation of the geometric shapes from a nested configuration to an installed configuration. In certain embodiments, high-level tags may simply include a set of Cartesian coordinates specifying the spatial state of the geometric shapes in the installed configuration and/or may include a series of rotation and translation commands to enable computation of the spatial configuration that corresponds to the installed configuration. The high-level tags may be incorporated into any mathematical algorithm known in the art for representing the translational relationships between the nested configuration and the installed configuration.

In certain embodiments, high-level tags include designations of certain edges or portions of the geometric shapes as "trailing lines" and/or "wrapping edges." These specific types of high-level tags are discussed below in the embodiments in which they are utilized.

Figure 1C:
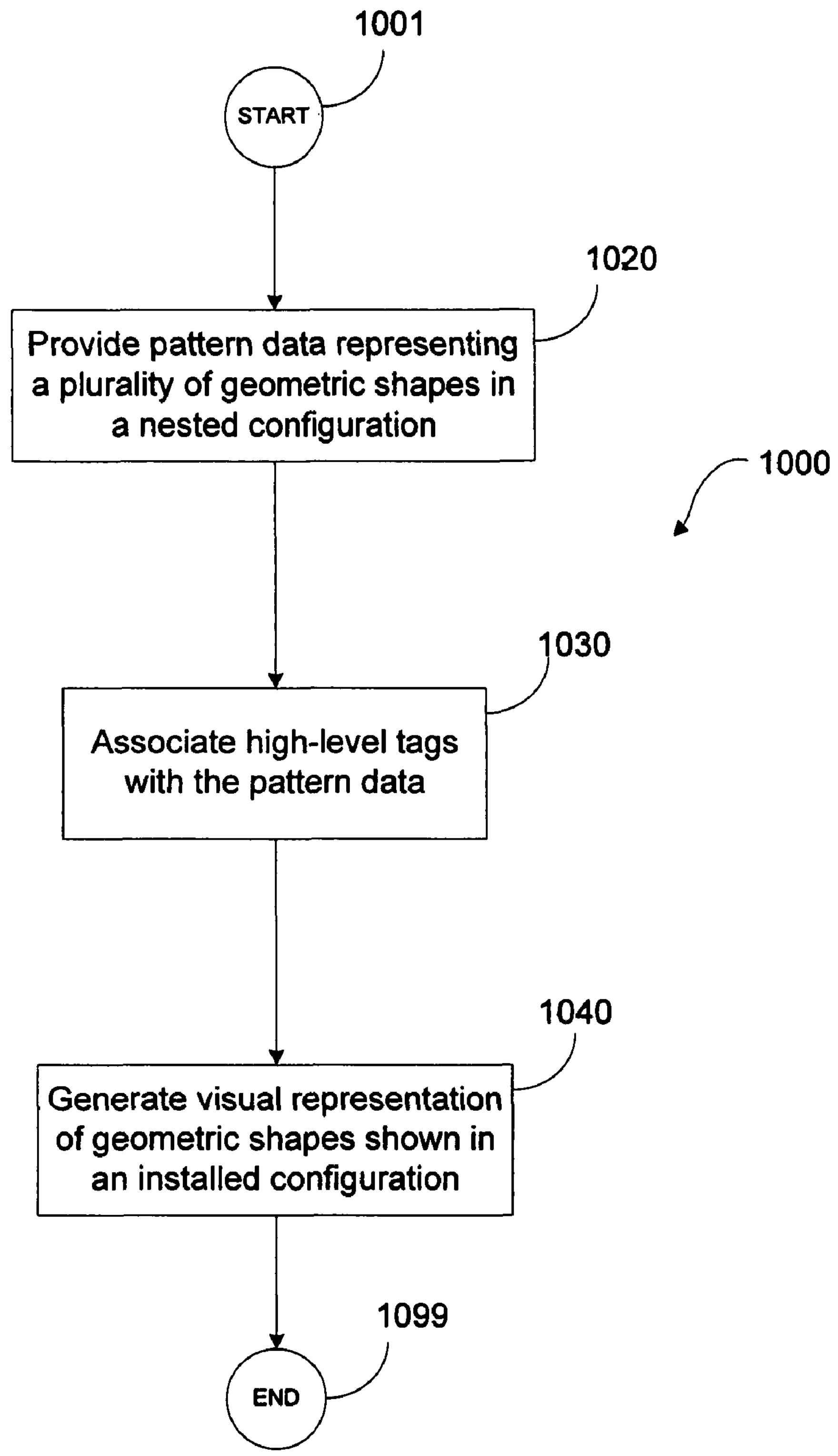
FIG. 1C illustrates an example of a method for manipulating a cutting pattern through rotation and translation operations and the visual representation of the resulting geometric shapes.

FIG. 1C illustrates an example of a method for manipulating a cutting pattern through rotation and translation operations and the visual representation of the resulting geometric shapes. Method 1000 commences at step 1001. In step 1020, pattern data is provided to represent a plurality of geometric shapes in a nested configuration. In step 1030, the pattern data is associated with high-level tags wherein each high-level tag comprises information translating the position of the geometric shapes from the nested configuration to an installed configuration. In step 1040, a visual representation of the geometric shapes is generated that corresponds to the spatial configuration of geometric shapes corresponding to the installed configuration. The visual representation is generated by plotting or displaying a visual rendering of the geometric shapes using techniques well known in the art for this purpose. Method 1000 terminates at step 1099.

Trailing Line Manipulation Operation

A variety of modifications may be applied to installed configuration 102 depicted in FIG. 1B. For instance, some consumers find the straight line of geometric shape 110 corresponding to the front hood to be unsightly (referred to herein as trailing line 112). As can be seen in FIG. 1B, trailing line 112 is an edge or an outline of a geometric shape. The trailing line may be shared by two or more geometric shapes where the edges form either a straight line or an arc of a consistent shared curvature (e.g. not having a discontinuity between the edges when depicted in the installed configuration). In this instance, trailing line 112 is shared among the edges of three geometric objects, 115, 120, and 125. Such edges or outlines are generally referred to herein as "trailing lines." Some consumers may prefer to modify a trailing line by changing it from a straight line to a gently-sloping curve.

More generally, a trailing line may be an arc of one curvature that the consumer changes to an arc of another curvature. In certain embodiments, the trailing line may be commence as a straight line (i.e. an arc of zero curvature). FIG. 2A shows an example of installed configuration 202 in which a user has modified trailing line 112 of FIG. 1B to produce trailing line 212. This modification of a trailing line may be generally referred to as a trailing line manipulation operation. A user may indicate the trailing line modification by specifying a slope of curvature to be applied to trailing line 112 of FIG. 1B. In certain embodiments, the user may simply indicate a fixed distance below the center of trailing line 112 from which a new curve may be generated, or the user may use a graphics program to "drag" trailing line 112 until the desired curvature is attained. In other embodiments, the user may select a trailing line of desired curvature from a library of curves. Any number of methods known in the art may be employed to specify the desired curvature of trailing line 112.

After manipulation of trailing line 112 to produce trailing line 212, modified pattern data may be generated to mathematically describe or represent the modified geometric shapes. In certain embodiments, the geometric shapes are modified with the addition of a trailing line by using a Boolean set subtraction operation. A Boolean set subtraction operation essentially "overlays" one geometric shape over another shape and computes a difference between the two shapes. By generating a curved shape that corresponds to the desired curvature specified by the user, a Boolean set subtraction operation may be performed between the curved shape and the original geometric shapes to arrive at the desired modified geometric shape or shapes. Other methods known in the art for applying a trailing line to the pattern data to generate modified pattern data may be incorporated into the methods described herein.

The modified pattern data and the high-level tags associated with each geometric shape may then be used to generate nested configuration 201 of FIG. 2B that corresponds to installed configuration 202 of FIG. 2A. Any of the translational mathematical routines known in the art may be used for mapping geometric shapes from one configuration to another configuration using the pattern data and high-level tags. Thus, a trailing line manipulation is one example of a manipulation to an installed configuration that is translated to a nested configuration to produce a modified cutting pattern that incorporates the modification to the installed configuration.

Figure 2C:
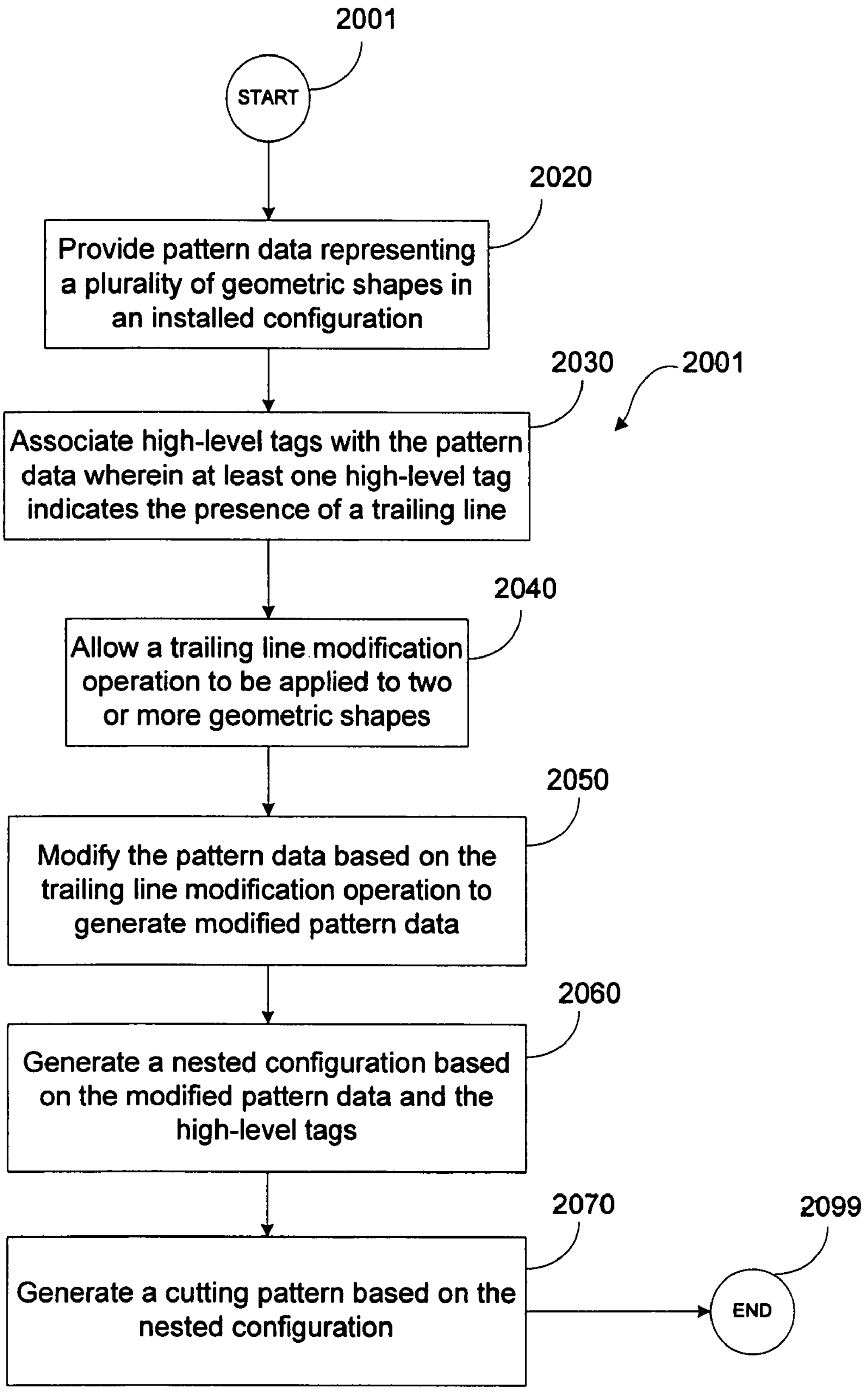
FIG. 2C is an example of a method for generating a cutting pattern based on a trailing line manipulation operation applied to one or more geometric shapes in an installed configuration.

FIG. 2C is an example of a method for generating a cutting pattern based on a trailing line manipulation operation applied to one or more geometric shapes in an installed configuration. Method 2001, illustrated in FIG. 2C, commences at step 2001. In step 2020, pattern data that represents a plurality of geometric shapes in an installed configuration is provided. In step 2030, high-level tags are associated with the pattern data wherein each high-level tag comprises information for translating the position of the geometric shapes from the nested configuration to an installed configuration. In this trailing line manipulation method, at least one high-level tag indicates the presence of a trailing line. In certain optional embodiments, a user may designate which edges are to be designated as wrapping edges. In other embodiments, the designation of certain edges as wrapping edges is preprogrammed or predetermined. In step 2040, the user modifies a trailing line according to user preference. In step 2050, the modification of the trailing line is used to modify the pattern data to reflect the trailing line modification to generate modified pattern data. In this way, the modified pattern data incorporates the trailing line modification. In step 2060, a nested configuration is generated based on the modified pattern data and the high-level tags. In step 2070, a cutting pattern is generated based on the nested configuration. The specific algorithms for generating a nested configuration from the modified pattern data and the high-level tags is detailed below in the section entitled, "Translation and Optimization Methods." Method 2001 terminates at step 2099.

Figure 2D:
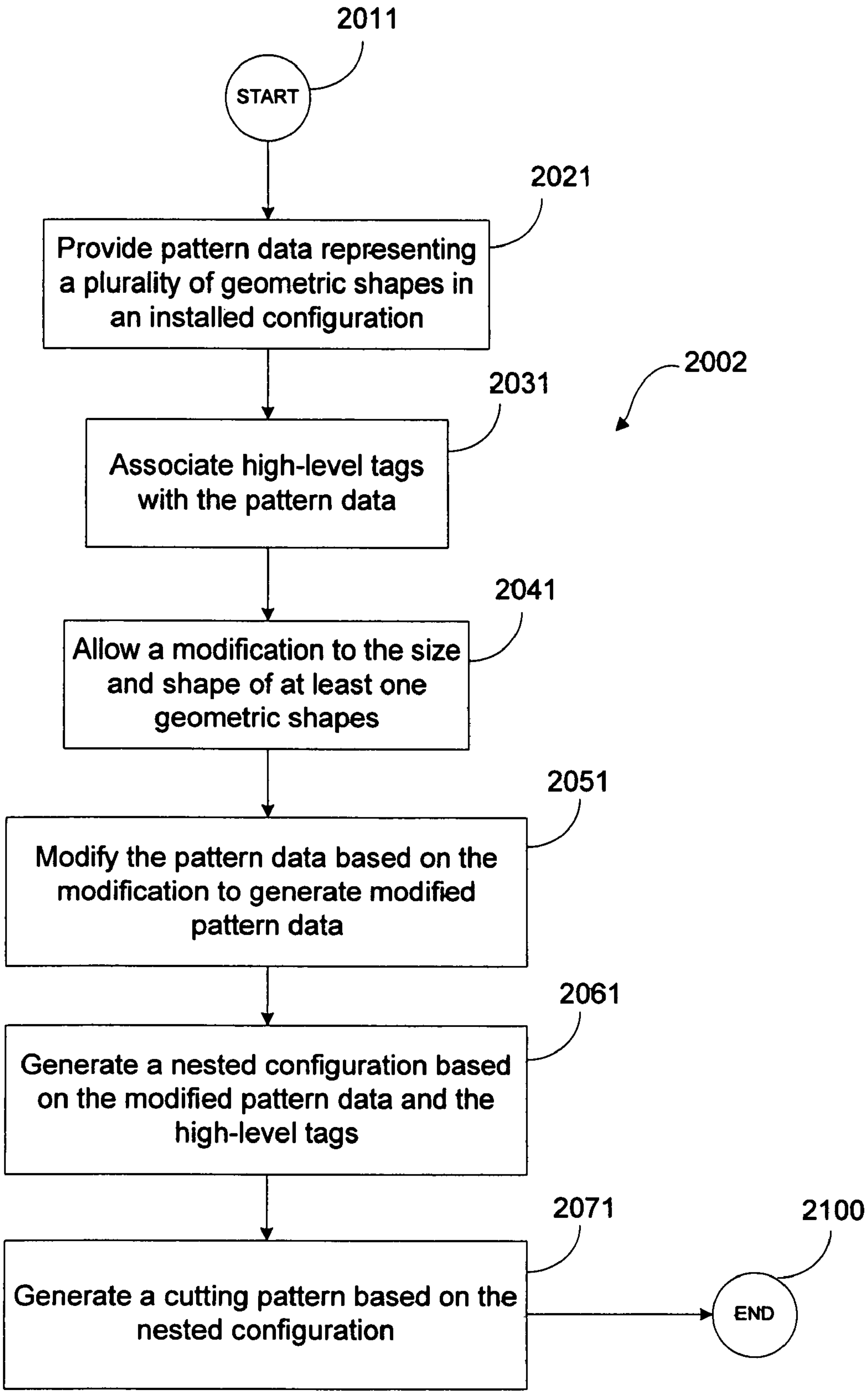
FIG. 2D is an example of a method for manipulating the shape of one or more of the geometric shapes in an installed configuration and then, determining a nested configuration that corresponds to the modified geometric shapes.

FIG. 2D is an example of a method for manipulating the shape of one or more of the geometric shapes in an installed configuration and then, determining a nested configuration that corresponds to the modified geometric shapes. Method 2002, illustrated in FIG. 2D, commences at step 2011. Method 2002 proceeds in a manner analogous to method 2001, but instead of applying a specific trailing line manipulation to geometric shapes, method 2002 more generally allows any modification to the size and shape of at least one geometric shape. In certain embodiments, standard vector artwork manipulations tools may be used to achieve the desired shape and size modifications to one or more of the geometric shapes.

In other embodiments, high-level user modification operations are used to achieve the desired shape and size modifications. The user may specify the desired modification of shape and size to one or more of the geometric by any method known in the art, including, but not limited to, standard vector artwork manipulation tools, selection of objects from a library of custom objects, specification of fixed modifications, direct modification of pattern data relating to geometric shapes, or any combination thereof. In preferred embodiments, the user selects the desired modification by selecting a high-level user operation that designates the type of operation to be performed, such as a general shape modification operation, a trailing line modification operation, an entity cut-down operation, or a wrap extension modification operation. The user may also select the degree to which the operation is applied. That is, in addition to specifying the type of operation to be performed, the user may select a dimension corresponding to the desired change. Method 2002 then proceeds in a manner analogous to Method 2001 so as to generate a cutting pattern in 2071.

The use of a high-level user operations to designate the type of operation to be performed is preferred in certain embodiments, because this input method avoids the standard vector artwork manipulation tools that can be, at times, tedious and difficult for some users to use. In other words, the option of high-level user operations to designate modification operations may be advantageous because such methods can be inherently more user-friendly than standard vector artwork manipulation tools.

Entity Cut-Down Operation

Pieces of protective film are usually cut from a sheet of fixed dimensions or from a roll of protective film of a particular width. Consequently, cutting patterns are usually adapted to be cut from protective film of certain fixed dimensions. Occasionally, however, a service provider may wish to adapt one cutting pattern made for a roll of protective film of one width to be cut from a roll of protective film of a different width. For example, a service provider may wish to adapt a cutting pattern made for a roll of protective film having a width of 24 inches to be cut from a roll having a width of 12 inches. Alternatively, in certain embodiments, adapting a 24" cutting pattern to a cutting pattern for a 12" roll allows a service provider to simultaneously cut two patterns from a 12" roll instead of cutting two patterns sequentially from a 24" roll.

The adaptation of a cutting pattern of a first dimension to a cutting pattern of different dimensions may be accomplished in a number of ways. In one embodiment, a portion of the geometric shapes is simply truncated in the installed configuration to form a modified installed configuration. Then, a new cutting pattern may then generated from a cutting pattern that corresponds to the modified installed configuration. In other embodiments, the nested configuration is generated by reference to the modified pattern data and the translation and rotation information inherent in the high-level tags so as to reconfigure the placement of the geometric shapes. In still other embodiments, the methods detailed below in the section entitled, "Translation and Optimization Methods," may use the modified pattern data and the high-level tags to generate the modified nested configuration, from which a modified cutting pattern may be generated.

Figure 3A:
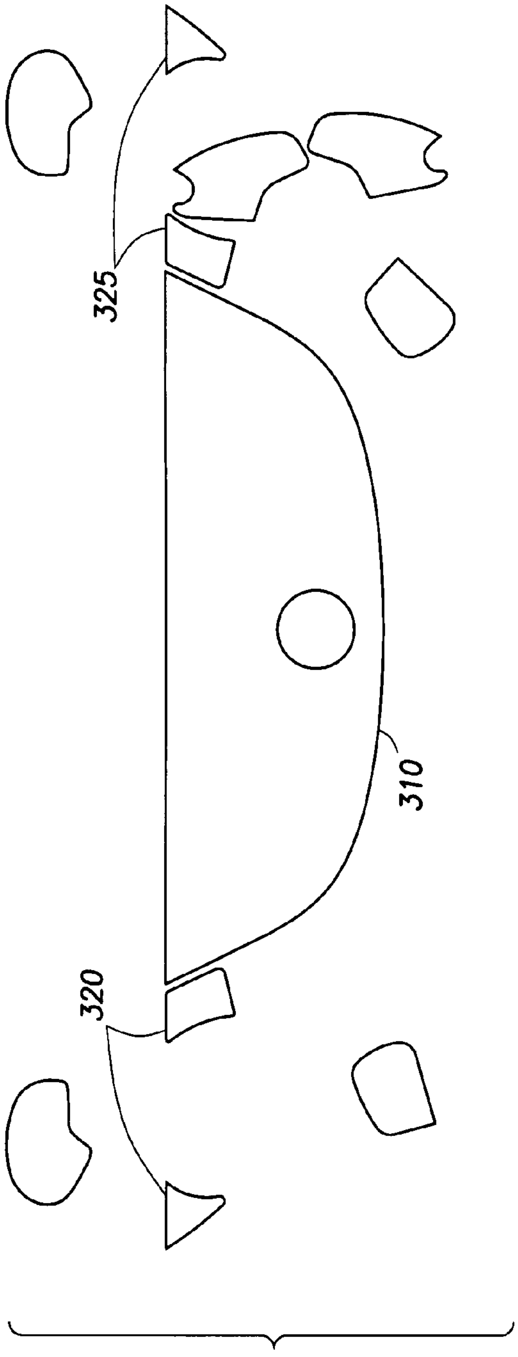
FIG. 3A illustrates a plurality of geometric shapes shown in an installed configuration.
Figure 3B:
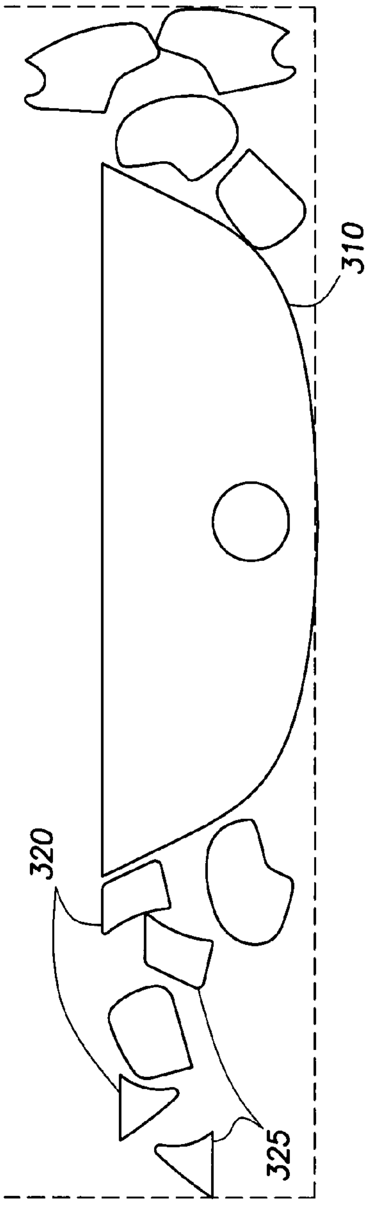
FIG. 3B illustrates the geometric shapes of FIG. 3A shown in a nested configuration.

As one example of an entity cut-down operation, FIG. 3A illustrates a plurality of geometric shapes shown in an installed configuration, and FIG. 3B illustrates the geometric shapes of FIG. 3A shown in a nested configuration. FIG. 3A shows a number of geometric shapes that have been truncated, including hood 310, right fender 320 and left fender 325 (as compared to FIG. 1A for example). These geometric shapes or pieces have been truncated to allow the cutting pattern to be adapted to a roll of protective film having a smaller width than the width of the roll of protective film for which the original cutting pattern was designed. In certain embodiments, the geometric shapes are truncated using a Boolean set subtraction operation. In those entity cut-down operations in which a new cutting pattern is generated by reducing the size of a cutting pattern, a lower cost cutting pattern may be developed that saves both the consumer and the service provider money. In other embodiments, other mathematical techniques known in the art may be used to reconfigure the geometric shapes to fit into sheets of protective film of differing dimensions (with and without change to the size and shape of particular geometric shapes therein). FIG. 3B shows one example of a nested configuration corresponding to the geometric shapes of FIG. 3A.

Figure 3C:
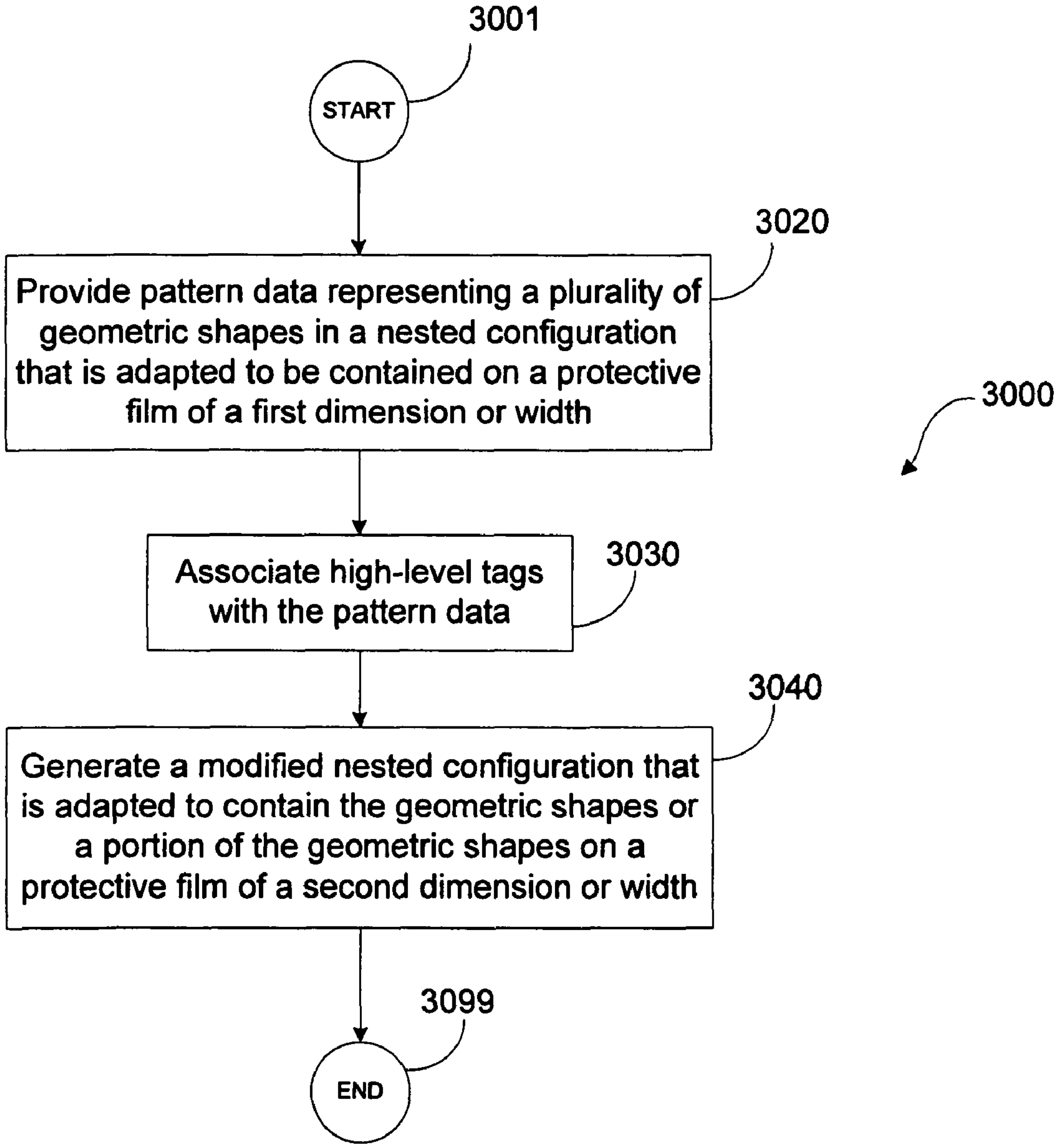
FIG. 3C illustrates an example of a method for manipulating a cutting pattern with an entity cut down operation.

FIG. 3C illustrates an example of a method for manipulating a cutting pattern with an entity cut-down operation. Method 3000 for modifying cutting patterns based on entity cut-down operations commences at step 3001. In step 3020, pattern data representing a plurality of geometric shapes is provided. High-level tags are associated with the pattern data in step 3030. Here, the pattern data and the high-level tags are adapted for a nested configuration corresponding to a protective film of a sheet of particular dimensions or a roll of a particular width of a first dimension. In step 3040, a modified nested configuration is generated that is adapted to contain the geometric shapes or a portion of the geometric shapes on a protective film of a second dimension or width. The algorithms discussed below in the section entitled, "Translation and Optimization Methods," may be used to generate the modified nested configurations of step 3040. Method 3000 terminates at step 3099.

Automated Extension

Figure 4A:
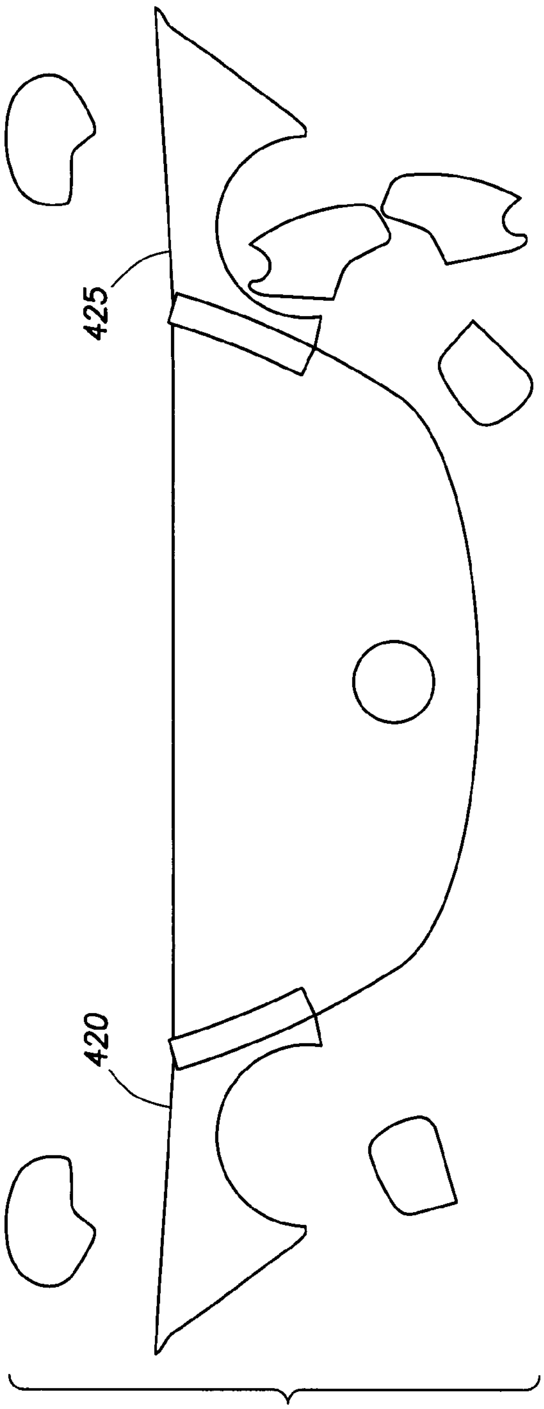
FIG. 4A illustrates a plurality of geometric shapes shown in an installed configuration in which some of the geometric shapes have been modified with a wrap extension operation.

FIG. 4A illustrates a plurality of geometric shapes shown in an installed configuration in which some of the geometric shapes have been modified with a wrap extension modification operation. Traditional cutting pattern designs typically approach the edge of a surface to be protected to within about 1/16 of an inch or 1/32 of an inch, leaving a small remaining portion of the surface vulnerable to damage. In certain embodiments, some consumers prefer cutting patterns that allow portions of protective film to wrap around a surface of a covered component for complete coverage. Accordingly, it is sometimes desirable to modify a cutting pattern to extend the wrapping edge of a geometric shape to allow a piece of protective film to be wrapped around a surface to be protected. The term "wrapping edge," as used herein is a designation of an edge of a geometric shape as an edge capable of encompassing or "wrapping around" the side or perimeter of a three-dimensional object. Examples of wrapping edges include, but are not limited to, the edges of a hood and the top edges of a fender. High-level tags may comprise designations of certain edges of geometric shapes as wrapping edges.

Consumers may also wish to extend an edge of a piece of protective film such as a window tint pattern to accommodate a window of varying seal size or to accommodate an installer preference. Some users may wish for the window tint pattern to terminate at the window seal while others may prefer the window tint pattern to extend under the window seal. The term "wrapping edge," as used herein, explicitly includes edges of a geometric shape to which an extension may be desired by the user even though the edge may not be used to wrap around the side of a surface to be protected.

Figure 4B:
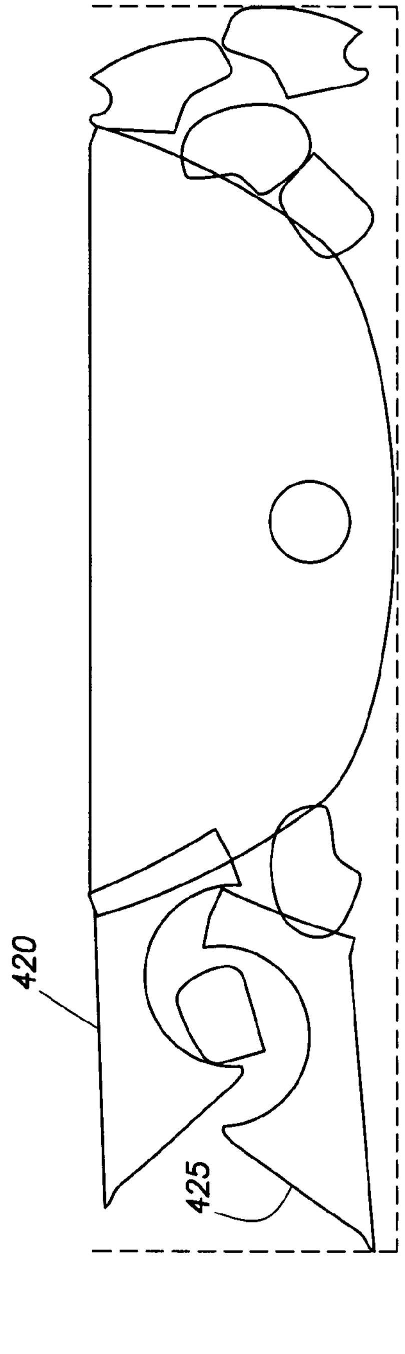
FIG. 4B illustrates the geometric shapes of FIG. 4A shown in a nested configuration.

As can be seen in FIG. 4A, the wrapping edges of right fender 420 and left fender 425 have been extended to allow these pieces of protective film to be wrapped around their respected protected surfaces. FIG. 4B illustrates the geometric shapes of FIG. 4A shown in a nested configuration. As can be seen in FIG. 4B, some of the geometric shapes are shown as overlapping one-another. In this embodiment, the high-level tags have been used to calculate the corresponding positions of the geometric shapes in the nested configuration, but without consideration of placement constraints such as the need for the geometric shapes to not overlap. Here, the user may wish to manually adjust the position of the geometric shapes using standard vector artwork manipulations tools to readjust the position of the geometric shapes so that they do not overlap. Alternatively, various automated means of achieving the same objective may be employed, such as the methods detailed below in the section entitled, "Translation and Optimization Methods."

Figure 4C:
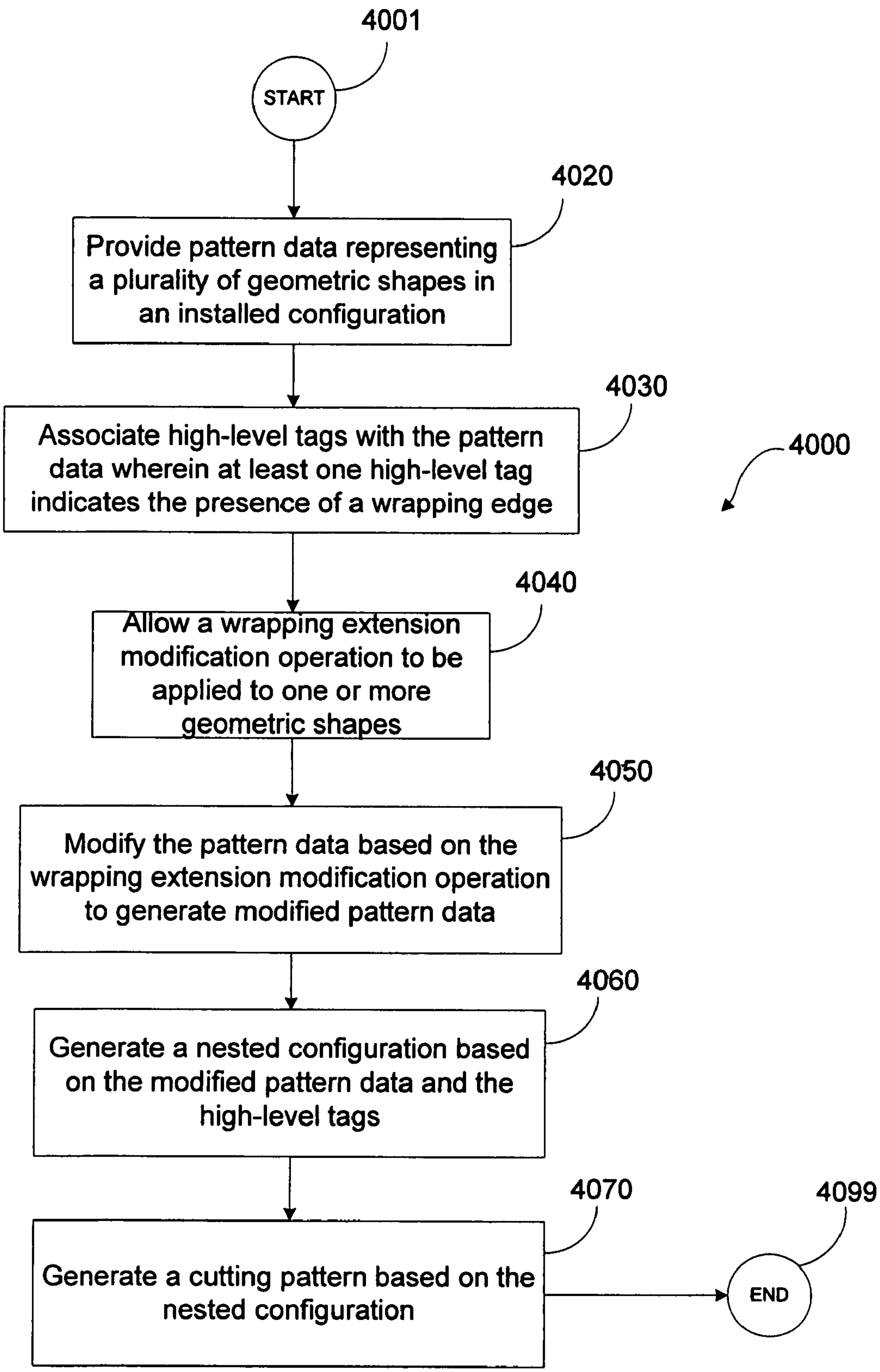
FIG. 4C illustrates an example of a method for manipulating a cutting pattern with a wrap extension operation.

FIG. 4C illustrates an example of a method for manipulating a cutting pattern with a wrap extension modification operation. Method 4000 for applying a wrap extension modification operation commences at step 4001. In step 4020, pattern data representing a plurality of geometric shapes is provided. In step 4030, high-level tags are associated with the pattern data wherein at least one high-level tag indicates the presence of a wrapping edge. In certain optional embodiments, a user may designate which edges or portions of edges are to be designated as wrapping edges. Typically, however, the designer of the original pattern will determine which edges constitute wrapping edges due to the design of the vehicle. In this way, the user does not have to be intimately familiar with which modification operations are feasible on which vehicles.

In step 4040, the user applies a wrapping extension to one or more of the geometric shapes by extending the wrapping edge. In certain embodiments, standard vector artwork manipulations tools may be used to achieve the desired extension of one or more wrapping edges. In preferred embodiments, however, the user simply selects the desired high-level user modification operation corresponding to a wrap extension modification operation. The user may also select the degree to which the operation is applied. That is, in addition to specifying a wrap extension modification operation, the user may select a dimension corresponding to the desired extension of the wrapping edge or edges. In certain embodiments, a user may specify a specific "distance past seal" to automatically extend a window tint pattern as desired.

In step 4050, the pattern data is modified to conform to the wrapping extension modification operation performed in step 4040. In step 4060, a nested configuration may be generated based on the modified pattern data and the high-level tags. In step 4070, A cutting pattern may then be generated based on the nested configuration of step 4060. Method 4099 terminates at step 4099.

Translation and Optimization Methods

As discussed above, the pattern data refers to the mathematical description of the geometric shapes. The dimensions and shapes of each geometric shape may be mathematically described by any method suitable to reproduce and render the geometric shapes, including, but not limited to, representing the geometric shapes by a set of Cartesian coordinates, representing the geometric shapes by a set of lines, curves, and/or arcs, any method known in the art for representing geometric shapes, or any combination thereof.

High-level tags, as used herein, refer to the high-level meta data that support specific high-level user operations including information indicating the appropriate orientation, rotation, and/or translation of the geometric shapes from a nested configuration to an installed configuration. In certain embodiments, high-level tags may simply include a set of Cartesian coordinates specifying the spatial state of the geometric shapes in the installed configuration and/or may include a series of rotation and translation commands to enable computation of the spatial configuration that corresponds to the installed configuration.

Thus, using high-level user operations, an installed configuration may be generated from a nested configuration and vice-versa by reference to the pattern data and the associated high-level tags. Other methods may be employed to translate between the two states (i.e. installed versus nested) using any suitable mathematical technique known in the art.

Other optimization methods may be employed in conjunction with the methods heretofore described. As explained above, the problem of laying out irregularly-sized geometric shapes on a sheet to minimize scrap losses is known as the cutting stock problem, and a variety of algorithms have been developed for addressing this problem of nesting irregularly shaped parts. A number of algorithms for solving the cutting stock problem are described in the following article: Sam Anand et al., *An Integrated Machine Vision Based System for Solving the Non-Convex Cutting Stock Problem Using Genetic Algorithms,* 18 Journal of Manf. Sys. 9 (1999), which is hereby incorporated by reference in full for all purposes. The terms "optimize," "optimizing," "optimization," and "optimized," as used herein include, but are not limited to, the methods discussed in this article, methods known in the art for addressing the cutting stock problem, and combinations thereof.

Alternatively, in certain embodiments, the user may choose to manually adjust the nested arrangement of geometric shapes to achieve desired objectives, which may include optimization of the use of protective film.

Figure 5:
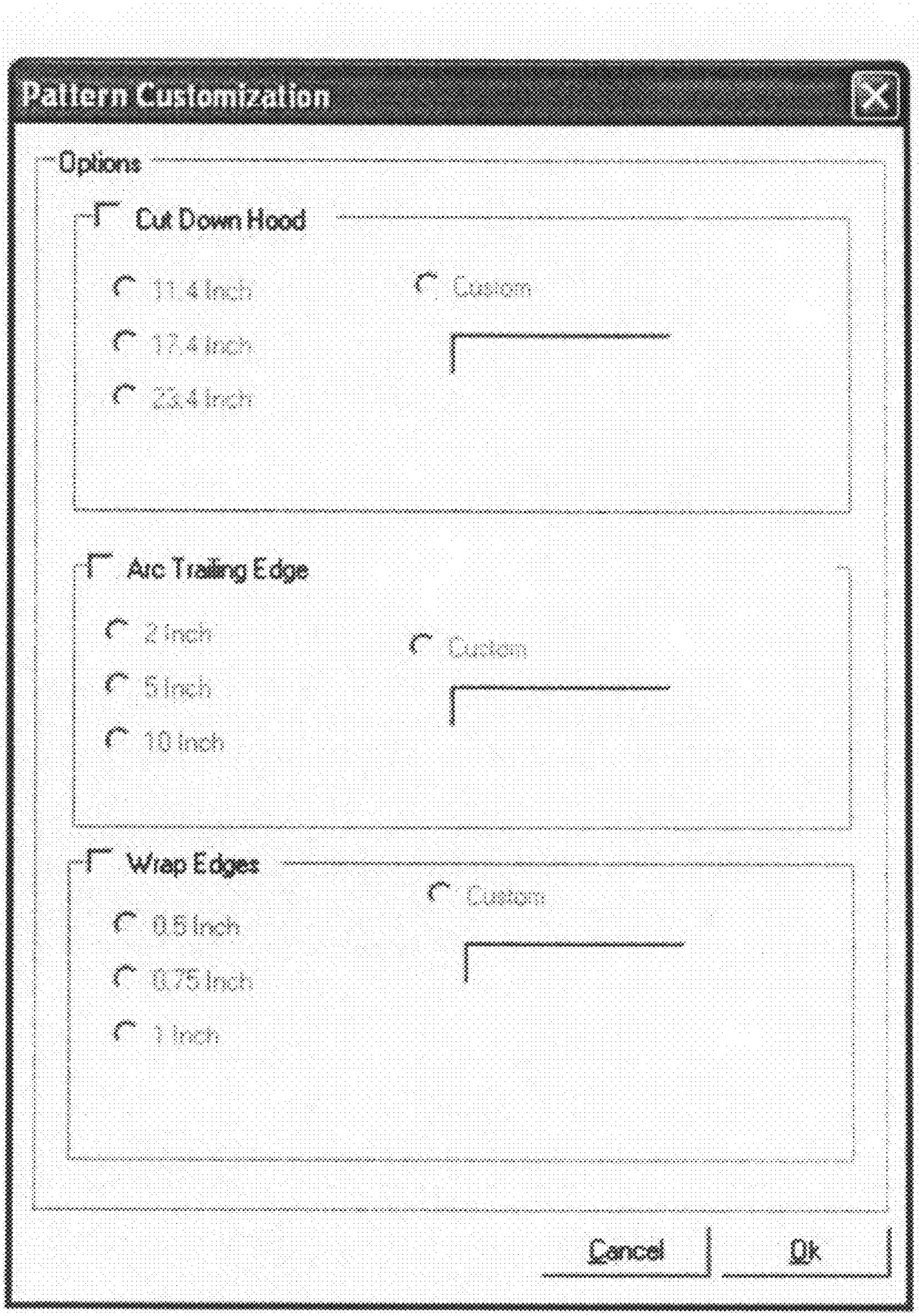
FIG. 5 is an example dialog box of a user interface.

The term "allowing modification," as used herein, refers to user input to an automated computer system or information handling system using any input method known in the art. As one example of a user input dialog box, FIG. 5 illustrates an example dialog box of a user interface for allowing user input for specifying a number of modification operations including an entity cut-down operation, a trailing line modification operation, and a wrapping edge modification operation. As shown in FIG. 5, each modification operation may be implemented from a number of predetermined modification operations or the user may specify a custom modification.

It is explicitly recognized that one or more methods of the present invention may be implemented via an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU or processor) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. An automated method implemented in a computer system for manipulation of a two-dimensional cutting pattern, the cutting pattern for cutting a plurality of geometric shapes from a protective film, the protective film for application to a three-dimensional object comprising:

providing pattern data wherein the pattern data represents the plurality of geometric shapes and a nested configuration of the geometric shapes residing in a two-dimensional plane wherein the pattern data may be used to form a plurality of commands to a cutter for cutting of the geometric shapes from the protective film wherein the plurality of commands are used to form the two-dimensional cutting pattern;

associating with the pattern data a plurality of high-level tags wherein each high-level tag is associated with a high-level user operation that comprises information translating the position of the geometric shapes from the nested configuration to an installed configuration; and generating a visual representation of the plurality of geometric shapes in an installed configuration by computing a repositioning of the geometric shapes based on the pattern data and the high-level tags wherein the installed configuration directly associates each geometric shape of the protective film with a portion of the three-dimensional object;

each high-level tag comprising an identification of a trailing line and a wrapping edge of the geometric shape with which the high-level tag is associated.

2. An automated method implemented in a computer system for manipulation of a two-dimensional cutting pattern, the cutting pattern for cutting a plurality of geometric shapes from a protective film, the protective film for application to a three-dimensional object comprising:

providing pattern data wherein the pattern data represents the plurality of geometric shapes and a nested configuration of the geometric shapes residing in a two-dimensional plane wherein the pattern data may be used to form a plurality of commands to a cutter for cutting of the geometric shapes from the protective film wherein the plurality of commands are used to form the two-dimensional cutting pattern;

associating with the pattern data a plurality of high-level tags wherein each high-level tag is associated with a high-level user operation that comprises information translating the position of the geometric shapes from the nested configuration to an installed configuration;

generating a visual representation of the plurality of geometric shapes in an installed configuration by computing a repositioning of the geometric shapes based on the pattern data and the high-level tags wherein the installed configuration directly associates each geometric shape of the protective film with a portion of the three-dimensional object;

allowing a modification of the size and shape of at least one of the geometric shapes in the installed configuration to produce a modified installed configuration;

modifying the pattern data based on the modification to generate a modified pattern data;

generating a nested configuration based on the modified pattern data and the high-level tags; and generating a modified cutting pattern based on the modified installed configuration.

3. The method of claim 2 wherein the modification comprises a high-level user modification operation.

4. The method of claim 3 wherein the high-level user modification operation is a trailing line modification operation, a wrap extension modification operation, an entity cut-down operation, or a combination thereof.

5. The method of claim 2 wherein the step of modifying the pattern data uses a Boolean set subtraction operation to create the modified pattern data.

6. The method of claim 2 further comprising optimizing the pattern data so as to result in an optimized cutting pattern that substantially minimizes the area of unused protective film.

7. The method of claim 2 further comprising optimizing the pattern data so as to generate a nested configuration that substantially minimizes a total surface area occupied by the geometric shapes.

8. An automated method implemented in a computer system for manipulation of a two-dimensional cutting pattern, the cutting pattern for cutting a plurality of geometric shapes from a protective film, the protective film for application to a three-dimensional object comprising:

providing pattern data wherein the pattern data represents the plurality of geometric shapes and a nested configuration of the geometric shapes residing in a two-dimensional plane wherein the pattern data may be used to form a plurality of commands to a cutter for cutting of the geometric shapes from the protective film wherein the plurality of commands are used to form the two-dimensional cutting pattern;

associating with the pattern data a plurality of high-level tags wherein each high-level tag is associated with a high-level user operation that comprises information translating the position of the geometric shapes from the nested configuration to an installed configuration;

generating a visual representation of the plurality of geometric shapes in an installed configuration by computing a repositioning of the geometric shapes based on the pattern data and the high-level tags wherein the installed configuration directly associates each geometric shape of the protective film with a portion of the three-dimensional object;

allowing a trailing line modification operation to be applied to one or more of the geometric shapes in the installed configuration to produce a modified installed configuration;

modifying the pattern data based on the trailing line modification operation to generate a modified pattern data that corresponds to the modified installed configuration;

generating a nested configuration based on the modified pattern data and the high-level tags; and generating a modified cutting pattern based on the nested configuration.

9. The method of claim 8 wherein the trailing line modification operation is the application of a curve of consistent curvature applied across a portion of the two or more of the geometric shapes.

10. The method of claim 9 wherein the curve of consistent curvature is selected from a set of predetermined curves, each curve having a consistent curvature.

11. An automated method implemented in a computer system for manipulation of a two-dimensional cutting pattern, the cutting pattern for cutting a plurality of geometric shapes from a protective film, the protective film for application to a three-dimensional object comprising:

providing pattern data wherein the pattern data represents the plurality of geometric shapes and a nested configuration of the geometric shapes residing in a two-dimensional plane wherein the pattern data may be used to form a plurality of commands to a cutter for cutting of the geometric shapes from the protective film wherein the plurality of commands are used to form the two-dimensional cutting pattern;

associating with the pattern data a plurality of high-level tags wherein each high-level tag is associated with a high-level user operation that comprises information translating the position of the geometric shapes from the nested configuration to an installed configuration;

generating a visual representation of the plurality of geometric shapes in an installed configuration by computing a repositioning of the geometric shapes based on the pattern data and the high-level tags wherein the installed configuration directly associates each geometric shape of the protective film with a portion of the three-dimensional object;

allowing a wrap extension modification to be applied to at least one geometric shape;

modifying the pattern data so as to incorporate the wrap extension modification into the at least one geometric shape to generate a modified pattern data; and generating a modified cutting pattern based on the modified pattern data and the high-level tags.

12. The method of claim 11 wherein the protective film is a window tint pattern and the wrap extension modification comprises a distance past window seal.

13. The method of claim 11 further comprising optimizing the pattern data so as to generate a nested configuration that substantially minimizes a total surface area occupied by the geometric shapes.

14. An automated method implemented in a computer system for manipulation of a two-dimensional cutting pattern, the cutting pattern for cutting a plurality of geometric shapes from a protective film, the protective film for application to a three-dimensional object comprising:

wherein the protective film is of a fixed width;

providing pattern data wherein the pattern data represents the plurality of geometric shapes and a nested configuration of the geometric shapes residing in a two-dimensional plane wherein the pattern data may be used to form cutting instructions for cutting of the geometric shapes from the protective film wherein the cutting instructions are used to form the two-dimensional cutting pattern;

wherein the cutting instructions are adapted to cut the geometric shapes from protective film of a first fixed width;

associating with the pattern data a plurality of high-level tags wherein each high-level tag is associated with a high-level user operation that comprises information translating the position of the geometric shapes from the nested configuration to an installed configuration; and generating a modified cutting pattern capable being adapted to a protective film of a second fixed width wherein the second fixed width is smaller than the first fixed width;

wherein the modified cutting pattern is generated by performing a Boolean set subtraction operation to truncate the pattern data by a width of at least the difference between the second fixed width and the first fixed width.

15. An automated method implemented in a computer system for manipulation of a two-dimensional cutting pattern, the cutting pattern for cutting a plurality of geometric shapes from a protective film, the protective film for application to a three-dimensional object comprising:

wherein the protective film is of a fixed width;

providing pattern data wherein the pattern data represents the plurality of geometric shapes and a nested configuration of the geometric shapes residing in a two-dimensional plane wherein the pattern data may be used to form cutting instructions for cutting of the geometric shapes from the protective film wherein the cutting instructions are used to form the two-dimensional cutting pattern;

wherein the cutting instructions are adapted to cut the geometric shapes from protective film of a first fixed width;

associating with the pattern data a plurality of high-level tags wherein each high-level tag is associated with a high-level user operation that comprises information translating the position of the geometric shapes from the nested configuration to an installed configuration;

generating a modified cutting pattern capable being adapted to a protective film of a second fixed width wherein the second fixed width is smaller than the first fixed width; and optimizing the pattern data so as to generate a modified nested configuration that substantially minimizes a total surface area occupied by the geometric shapes.

16. An automated method implemented in a computer system for manipulation of a two-dimensional cutting pattern, the cutting pattern for cutting a plurality of geometric shapes from a protective film, the protective film for application to a three-dimensional object comprising:

providing pattern data representing the plurality of geometric shapes in an installed configuration;

associating with the pattern data a plurality of high-level tags wherein each high-level tag is associated with a high-level user operation that comprises information translating the position of the geometric shapes from a nested configuration to the installed configuration;

allowing modification to the geometric shapes in the installed configuration;

modifying the pattern data to incorporate the modification so as to generate modified pattern data; and generating a cutting pattern based on the modified pattern data and the high-level tags that correspond to a nested configuration of the geometric shapes wherein the nested configuration is optimized so as to substantially minimize a total surface area occupied by the geometric shapes on the protective film.

17. An automated pattern manipulation system for manipulating a two-dimensional cutting pattern, the cutting pattern for cutting a plurality of geometric shapes from a protective film, the protective film for application to a three-dimensional object, said system comprising:

(a) electronics adapted to (1) store pattern data wherein the pattern data represents the plurality of geometric shapes and a nested configuration of the geometric shapes residing in a two-dimensional plane wherein the pattern data may be used to form a plurality of commands to a cutter for cutting of the geometric shapes from the protective film wherein the plurality of commands are used to form the two-dimensional cutting pattern and wherein the pattern data is associated with a plurality of high-level tags wherein each high-level tag is associated with a high-level user operation that comprises information translating the position of the geometric shapes from the nested configuration to an installed configuration and (2) generate a modified cutting pattern based on a plurality of modification instructions, the pattern data, and the high-level tags wherein the modified cutting pattern is optimized so as to generate a nested configuration that substantially minimizes a total surface area occupied by the geometric shapes when the geometric shapes are conformed to fit in the dimensions of the protective film in a two-dimensional plane; and (b) a user interface adapted to: (1) receive the modification instructions corresponding to modifications to the geometric shapes in one of (i) a nested configuration and (ii) an installed configuration; and (2) display the modified cutting pattern and the modified installed configuration.

* * * * *